Patented Mar. 28, 1944

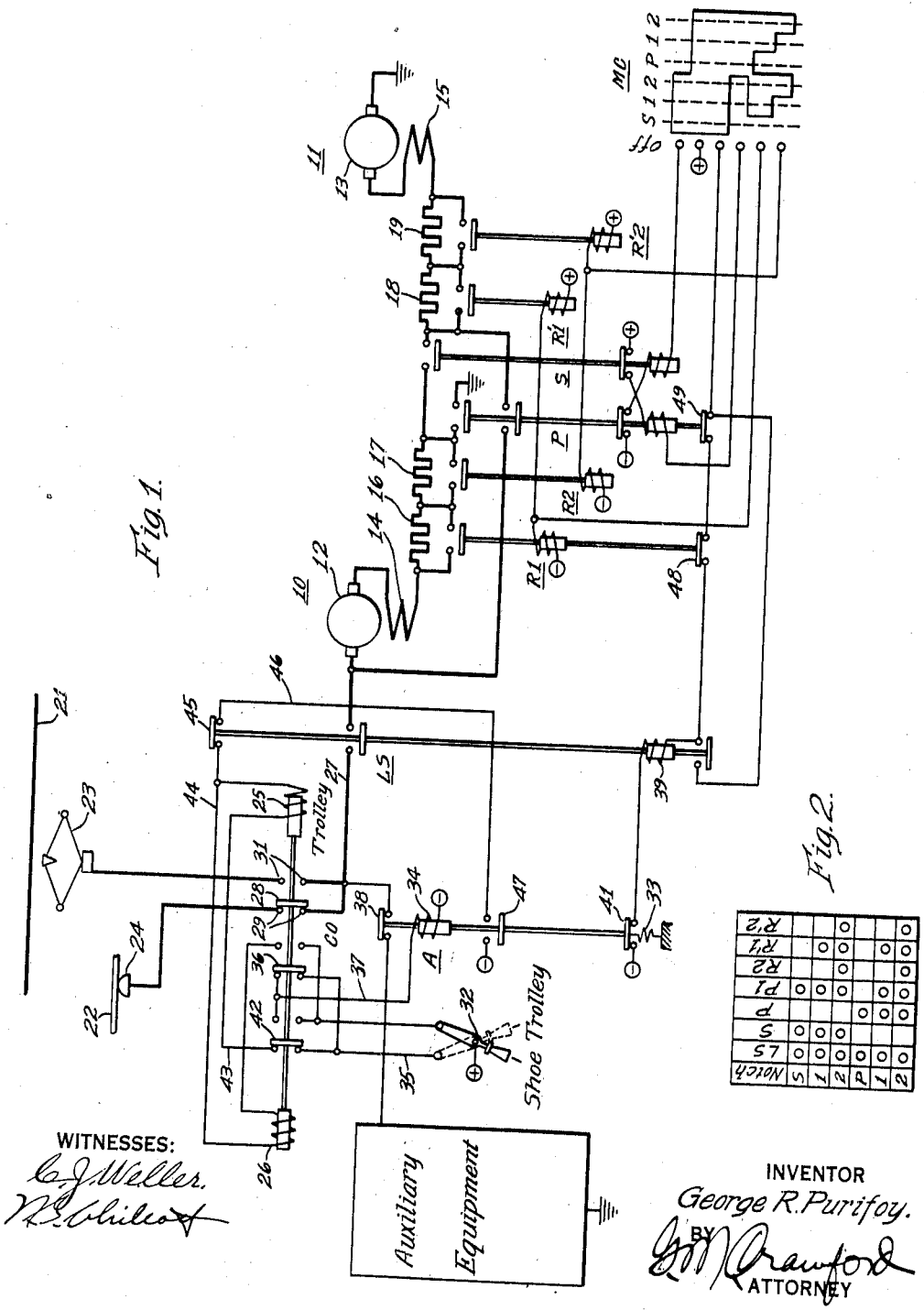

2,345,149

UNITED STATES PATENT OFFICE 2,345,149

CONTROL SYSTEM

George R. Purifoy, Pittsburgh, Pa., assignor to Westinghouse Electric & Manufacturing Company, East Pittsburgh, Pa., a corporation of Pennsylvania Application March 31, 1942, Serial No. 436,977

7 Claims. (Cl. 172—179)

My invention relates, generally, to control systems and, more particularly, to systems for controlling the operation of changeover switches.

In modern electrically driven trains, it is necessary to supply electric power to a large amount of auxiliary equipment, as well as to the motors which propel the train. For the convenience of the passengers, it is essential that power be supplied to the auxiliary equipment even when the train is standing at a station and the main motors are disconnected from the power source. Furthermore, when a train passes from a section in which power is supplied through an overhead trolley to a section in which the power is supplied through a third rail, or vice versa, the changeover should be made as quickly as possible in order to avoid interrupting the operation of the auxiliary equipment longer than necessary. However, since the changeover switch is not designed to interrupt the power circuit while carrying load current, the power load should be removed before the changeover switch is operated.

An object of my invention, generally stated, is to provide for operating a changeover switch in a simple and efficient manner.

A more specific object of my invention is to prevent the operation of a changeover switch while carrying load current.

Another object of my invention is to provide for maintaining power on an auxiliary load circuit at all times except during the operation of the switch which changes the load circuits from one power source to another.

A further object of my invention is to provide a changeover switch control system which may be utilized on either a single car unit or on multiple unit electric trains.

Other objects of my invention will be explained fully hereinafter or will be apparent to those skilled in the art.

In practicing my invention, the operation of a shoe-trolley changeover switch is so controlled by interlocks provided on the switches which control the main motor load circuit and the auxiliary load circuit of an electrically operated train that the changeover switch cannot be operated while carrying current. The switches controlling the motor circuits can be opened independently of the auxiliary load circuit, thereby providing for a continuous supply of power to the auxiliary load except during the operation of the changeover switch.

For a fuller understanding of the nature and objects of my invention, reference may be had to the following detailed description, taken in conjunction with the accompanying drawing, in which:

Figure 1 is a diagrammatic view of a control system embodying my invention; and

Fig. 2 is a chart showing the sequence of operation of certain of the switches in the control system.

Referring to the drawing, the system shown therein comprises a pair of motors 10 and 11 which may be of the series type having armature windings 12 and 13 and series field windings 14 and 15, respectively. In accordance with the usual practice in railway control systems, the motors 10 and 11 are first connected in series-circuit relation by a switch S, and then in parallel-circuit relation by a switch P. During the acceleration of the motors, the motor current is controlled by resistor shunting switches R1, R2, R'1, and R'2 which shunt resistors 16 to 19 from the motor circuit in a manner well known in the art. In order to simplify the drawing and description, only a few resistor shunting switches have been shown. It will be understood that additional resistors and resistor shunting switches may be utilized, if desired.

Electric power for operating the motors may be supplied from any suitable power source through either an overhead conductor 21 or a third-rail conductor 22. A current collector 23, which may be mounted on top of the vehicle (not shown), is disposed for engaging the overhead conductor 21. A collector 24, of the shoe type, is disposed to engage the third rail 22.

A line switch LS is provided for controlling the power circuit to the motors 10 and 11. The operation of the switch LS and also the switches S and P and the resistor shunting switches R1, R2, R'1, and R'2 may be controlled by a manually operable master controller MC in the usual manner.

A changeover switch CO is provided for selectively connecting the power circuit for the motors 10 and 11 to either the trolley collector 23 or the shoe collector 24, depending upon the section of the system in which the vehicle is operating. As shown, the changeover switch CO is provided with two solenoids 25 and 26. The switch CO is of the type which remains in the position to which it is actuated by the energization of one of the solenoids until the other solenoid is energized to actuate the switch to its other position.

Thus, as illustrated, the solenoid 26 has been energized to actuate the switch CO to the position in which the shoe collector 24 is connected to a load conductor 27 through a bridging contact member 28 which bridges the contact members 29 of the switch. When the solenoid 25 is energized, the switch CO will be actuated to cause the contact member 28 to bridge contact members 31 of the switch, thereby connecting the trolley collector 23 to the load conductor 27. The operation of the changeover switch CO may be controlled by a manually operable control switch 32 which has two operating positions designated "shoe" and "trolley."

As explained hereinbefore, modern electric trains are provided with a large amount of auxiliary equipment, such as heating, air-conditioning and refrigerating apparatus, as well as lighting equipment, which requires that electric power be supplied for their operation with a minimum amount of interruption of the power supply. In the present system, the auxiliary equipment is supplied with power from the load conductor 27 through an auxiliary switch A. Since the switch A is connected to the load conductor 27 ahead of the line switch LS, the switch LS may be opened to disconnect the motors 10 and 11 from the power supply without interrupting the supply of power to the auxiliary equipment.

However, since the changeover switch CO is not designed to interrupt the power circuit while carrying load current, it is necessary to open the auxiliary switch A during the time of operation of the changeover switch CO to change the load circuit from the one current collector to the other. In order to avoid interrupting the operation of the auxiliary equipment longer than necessary, the changeover should be made as quickly as possible without damaging the changeover switch.

In order to insure that both the main motor circuit and the auxiliary power circuit are both opened before the changeover switch can operate, the operation of the changeover switch is so controlled by interlocks provided on the line switch LS, and the auxiliary switch A, that both of these switches must be opened prior to the operation of the changeover switch. However, it is not necessary to open the auxiliary switch A at the same time that the line switch LS is opened. Thus, the opening of the auxiliary switch A may be delayed until just prior to the time of operation of the changeover switch, and the auxiliary switch A is reclosed immediately after the operation of the changeover switch. The auxiliary switch A is of a type which is normally held closed by a spring 33, and is opened by the energization of a solenoid 34. In this manner, the time during which the supply of power to the auxiliary equipment is interrupted is reduced to a minimum.

In order that the functioning of the foregoing apparatus may be more clearly understood, the operation of the system will now be described in more detail. Assuming that the changeover switch CO is in the position shown to connect the shoe collector 24 to the load conductor 27 and it is desired to change over for trolley operation, the switch 32 is actuated to the "trolley" position.

Prior to the operation of the switch 32, the master controller MC should be returned to the "off" position to deenergize the line switch LS, thereby disconnecting the motors 10 and 11 from the power circuit. However, should the operator fail to return the controller MC to the "off" position, provision is made for insuring that the switch LS will be opened prior to the operation of the changeover switch. It is then necessary for the controller to be returned to the "off" position before the switch LS can be reclosed to reapply power to the motors.

When the switch 32 is actuated to the "trolley" position, a circuit is established from positive through the switch 32, conductor 35, an interlock 36 on the switch CO, conductor 37, and the actuating coil of the switch A to negative. The energization of the coil 34 opens the main contact members 38 of the switch A against the action of the spring 33, thereby deenergizing the power circuit to the auxiliary equipment.

The operation of the switch A also deenergizes the actuating coil 39 of the switch LS by opening an interlock 41 on the switch A in the event that the coil of the switch LS has not been deenergized by returning the controller MC to the "off" position prior to the operation of the switch 32, as explained hereinbefore.

Following the operation of the switch A, an energizing circuit is established for the actuating coil 25 of the switch CO through a circuit which extends from the conductor 35 through an interlock 42 on the switch CO, conductor 43, the actuating coil 25, conductor 44, an interlock 45 on the switch LS, conductor 46, and an interlock 47 on the switch A to negative.

As explained hereinbefore, the energization of the coil 25 actuates the switch CO to connect the trolley collector 23 to the load circuit 27. Furthermore, the operation of the switch CO interrupts the energizing circuit for the coil 34 of the switch A which extends through the interlock 36 on the switch CO, thereby permitting the switch A to be reclosed immediately following the operation of the switch CO. In this manner, the operation of the auxiliary equipment is interrupted only during the time required for the changeover switch CO to complete the changeover operation and the reestablishment of power to the auxiliary equipment is not dependent upon any action being taken by the operator of the vehicle.

Since the energizing circuit for reclosing the switch LS must be established through interlocks 48 and 49 on the switches R1 and P, respectively, it is necessary to return the controller MC at least to the position "S" to deenergize these switches before the switch LS can be reclosed to reapply power to the motors 10 and 11. In this manner, the insertion of the resistors 16 to 19 in the motor circuit is insured. After the closing of the switch LS, the controller MC may be advanced in the usual manner to cause the resistors 16 to 19 to be shunted from the motor circuit, thereby accelerating the motors to the desired speed. The usual interlocking is provided on the switches S and P to insure their proper sequence of operation during transition from series to parallel operation.

The change from trolley to third rail is performed in a manner similar to the change from third rail to trolley. The switch 32 is actuated to the "shoe" position, thereby energizing the actuating coil 34 of the switch A and the coil 26 of the switch CO through the proper interlocks in the manner hereinbefore described.

From the foregoing description, it is apparent that I have provided a system for controlling the operation of a changeover switch which insures the protection of the switch by preventing its operation prior to the removal of the power load from the circuits controlled by the switch. Furthermore, unnecessary interruption of the supply of power to a portion of the equipment is prevented, and the immediate restoration of power to the equipment is provided by the system herein disclosed. The present system may be readily utilized on cars or other electrically propelled vehicles which are operated either singly or in trains which may be controlled from either end of the train, since the present equipment is adapted for multiple unit operation.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a main load circuit, an auxiliary load circuit, switching means for controlling the main load circuit, additional switching means for controlling the auxiliary load circuit, a pair of power conductors for supplying power to the load circuits, a changeover switch operable to two different positions for alternately connecting the power conductors to the load circuits, and means for preventing operation of the changeover switch from one position to the other while the load circuits are energized through said switching means.

2. In a control system, in combination, a main load circuit, an auxiliary load circuit, switching means for controlling the main load circuit, additional switching means for controlling the auxiliary load circuit, a plurality of power conductors for supplying power to the load circuits, a changeover switch operable to a plurality of different positions for alternately connecting the power conductors to the load circuits, and means for preventing operation of the changeover switch from one position to another while either of said load circuits is energized through said switching means.

3. In a control system, in combination, a main load circuit, an auxiliary load circuit, switching means for controlling the main load circuit, additional switching means for controlling the auxiliary load circuit, a pair of power conductors for supplying power to the load circuits, a changeover switch operable to two different positions for alternately connecting the power conductors to the load circuits, and means associated with said switching means for preventing operation of the changeover switch from one position to the other while either of said load circuits is energized through said switching means.

4. In a control system, in combination, a main load circuit, an auxiliary load circuit, switching means for controlling the main load circuit, additional switching means for controlling the auxiliary load circuit, a plurality of power conductors for supplying power to the load circuits, a changeover switch operable to a plurality of different positions for alternately connecting the power conductors to the load circuits, and interlocking means actuated by said switching means for preventing operation of the changeover switch from one position to another while either of said load circuits is energized through said switching means.

5. In a control system, in combination, a main load circuit, an auxiliary load circuit, switching means for controlling the main load circuit, additional switching means for controlling the auxiliary load circuit, a pair of power conductors for supplying power to the load circuits, a changeover switch for alternately connecting the power conductors to the load circuits, and interlocking means on both the switching means for the main load circuit and the switching means for the auxiliary load circuit for preventing operation of the changeover switch while said load circuits are energized through said switching means.

6. In a control system, in combination, a main load circuit, an auxiliary load circuit, a main switch for controlling the main load circuit, an auxiliary switch for controlling the auxiliary load circuit, a pair of power conductors for supplying power to the load circuits, a changeover switch for alternately connecting the power conductors to the load circuits, and interlocking means on both the main switch and the auxiliary switch for jointly preventing operation of the changeover switch while the load circuits are energized through said switches.

7. In a control system, in combination, a main load circuit, an auxiliary load circuit, a main switch for controlling the main load circuit, an auxiliary switch for controlling the auxiliary load circuit, a pair of power conductors for supplying power to the load circuits, a changeover switch for alternately connecting the power conductors to the load circuits, interlocking means on the auxiliary switch for controlling the operation of the main switch and interlocking means on the main switch and the auxiliary switch for preventing operation of the changeover switch while either of the load circuits is energized through said switches.

GEORGE R. PURIFOY.